US012741265B2

(12) United States Patent
Green et al.

(10) Patent No.: US 12,741,265 B2
(45) Date of Patent: Sep. 22, 2026

(54) AMMONIUM-FUNCTIONALIZED POLYSULFONE COPOLYMERS FOR MOISTURE-SWING $CO_2$ CAPTURE

(71) Applicant: ARIZONA BOARD OF REGENTS ON BEHALF OF ARIZONA STATE UNIVERSITY, Scottsdale, AZ (US)

(72) Inventors: Matthew Green, Phoenix, AZ (US); Hoda Shokrollahzadeh Behbahani, Tempe, AZ (US); Yi Yang, Mesa, AZ (US)

(73) Assignee: ARIZONA BOARD OF REGENTS ON BEHALF OF ARIZONA STATE UNIVERSITY, Scottsdale, AZ (US)

( * ) Notice: Subject to any disclaimer, the term of this patent is extended or adjusted under 35 U.S.C. 154(b) by 1088 days.

(21) Appl. No.: 17/793,925

(22) PCT Filed: Feb. 1, 2021

(86) PCT No.: PCT/US2021/016060
§ 371 (c)(1),
(2) Date: Jul. 19, 2022

(87) PCT Pub. No.: WO2021/155357
PCT Pub. Date: Aug. 5, 2021

(65) Prior Publication Data

US 2023/0038851 A1 Feb. 9, 2023

Related U.S. Application Data

(60) Provisional application No. 62/968,140, filed on Jan. 30, 2020.

(51) Int. Cl.

| | |
|---|---|
| ***C08G 75/23*** | (2006.01) |
| ***B01D 53/62*** | (2006.01) |
| ***B01D 53/81*** | (2006.01) |
| ***B01J 20/26*** | (2006.01) |
| ***B01J 20/28*** | (2006.01) |
| ***B01J 20/30*** | (2006.01) |

(52) U.S. Cl.
CPC ............ *B01J 20/265* (2013.01); *B01D 53/62* (2013.01); *B01D 53/81* (2013.01); *B01J 20/28004* (2013.01); *B01J 20/28023* (2013.01); *B01J 20/28033* (2013.01); *B01J 20/3085* (2013.01); *C08G 75/23* (2013.01); *B01D 2253/202* (2013.01); *B01D 2253/304* (2013.01); *B01D 2257/504* (2013.01)

(58) Field of Classification Search
CPC ...................................................... C08G 75/23
See application file for complete search history.

(56) References Cited

U.S. PATENT DOCUMENTS

| | | | | |
|---|---|---|---|---|
| 6,780,893 B2 * | 8/2004 | Sugaya | C08L 81/06 525/534 |
| 9,283,510 B2 | 3/2016 | Lackner | |
| 2008/0102342 A1 * | 5/2008 | Cho | C08G 75/23 429/492 |
| 2012/0304858 A1 | 12/2012 | Wright | |
| 2019/0300653 A1 | 10/2019 | Green | |
| 2021/0108067 A1 * | 4/2021 | Bae | B01D 71/80 |

FOREIGN PATENT DOCUMENTS

| | | |
|---|---|---|
| EP | 2160234 B1 | 3/2010 |
| KR | 20170115697 | 10/2017 |
| WO | 2016164563 A1 | 10/2016 |

OTHER PUBLICATIONS

English language translation KR 2017/115697, Dec. 2017.*
Armstrong, et al., "Rapid CO2 capture from ambient air by sorbent-containing porous electrospun fibers made with the solvothermal polymer additive removal technique," AIChE J., vol. 65, No. 1, pp. 214-220, 2019, doi: 10.1002/aic.16418.
He et al., "Porous polymers prepared via high internal phase emulsion polymerization for reversible CO2 capture," Polymer,(2014) vol. 55, No. 1, pp. 385-394, , doi: 10.1016/j.polymer.2013.08.002.
He et al., "Reversible CO2 capture with porous polymers using the humidity swing," Energy Environ. Sci., vol. 6, No. 2, pp. 488-493, 2013, doi: 10.1039/c2ee24139k.
He et al., "Three-dimensionally ordered macroporous polymeric materials by colloidal crystal templating for reversible CO2 capture," Adv. Funct. Mater., vol. 23, No. 37, pp. 4720-4728, 2013, doi: 10.1002/adfm.201300401.

(Continued)

*Primary Examiner* — Margaret G Moore
(74) *Attorney, Agent, or Firm* — FULLER IP LAW LLC; Rodney J. Fuller

(57) ABSTRACT

A quaternary ammonium-functionalized poly(arylene ether sulfone) copolymer for moisture-swing CO2 capture, and a method for producing the same, is disclosed. The copolymer includes a polysulfone copolymer having a copolymerization unit based on diallyl bisphenal A (DABA) and has quaternary ammonium functionalities. The method for preparation of a quaternary ammonium-functionalized poly (arylene ether sulfone) copolymer includes reacting diallyl bisphenol A (DABA) with bisphenol A (BPA) and 4,4'-difluorodiphenyl sulfone (DFDPS) to form an allyl-modified poly(arylene ether sulfone) (PAES-co-APAES) copolymer, then modifying the PAES-co-APAES copolymer to convert the allyl functionalities to tertiary amines, forming tertiary amine-modified PAES (PAES-co-TAPAES) copolymer. The method also includes converting the tertiary amine of the PAES-co-TAPAES copolymer to quaternary ammonium, forming quaternary ammonium-modified PAES. These quaternary ammonium-modified PAES may be processed into membranes, films, and hollow fibers.

14 Claims, 2 Drawing Sheets

(56) References Cited

OTHER PUBLICATIONS

Hou, Y. Wu, et al., "Preparation of Quaternized Bamboo Cellulose and Its Implication in Direct Air Capture of CO 2," Energy and Fuels, vol. 33, No. 3, pp. 1745-1752, 2019, doi: 10.1021/acs.energyfuels.8b02821.
International Energy Agency, "Global CO2 emissions in 2019," 2019. [Online]. Available: https://www.iea.org/.
Jiang, et al., "Spherical amine grafted silica aerogels for CO2 capture" RSC Adv., No. 10, p. 25911-25917, 2020, doi: 10.1039/d0ra04497k.
Lackner, "Capture of carbon dioxide from ambient air," Eur. Phys. J. Special Topics, vol. 176, pp. 93-106, 2009, doi: 10.1140/epjst/e2009-01150-3.
Lerari, "Synthesis and Characterization of New Copolymer Based Cinnamyl Methacrylate Monomer: Determination of Monomer Reactivity Ratio and Statistical Sequence", Materials Research, (20150000), vol. 18, No. 5, pp. 1008-1014.
National Geographic, "Fossil fuels, explained," 2019. [Online]. Available: https://www.nationalgeographic.com/.
Shi, et al., "Capture CO2 from Ambient Air Using Nanoconfined Ion Hydration," Angew. Chemie—Int. Ed., vol. 55, No. 12, pp. 4026-4029, 2016, doi: 10.1002/anie.201507846.
Shi, et al., "Kinetic analysis of an anion exchange absorbent for CO2 capture from ambient air," PLoS One, vol. 12, No. 6, pp. 1-12, 2017, doi: 10.1371/journal.pone.0179828.
Song et al., "Quaternized Chitosan/PVA Aerogels for Reversible CO2 Capture from Ambient Air," Ind. Eng. Chem. Res., vol. 57, No. 14, pp. 4941-4948, 2018, doi: 10.1021/acs.iecr.8b00064.
Song, et al., "Moisture Swing lon-Exchange Resin-PO4 Sorbent for Reversible CO2 Capture from Ambient Air," Energy and Fuels, vol. 33, No. 7, pp. 6562-6567, 2019, doi: 10.1021/acs.energyfuels.9b00863.
Wang et al., "A moisture swing sorbent for direct air capture of carbon dioxide: Thermodynamic and kinetic analysis," Energy Procedia, vol. 37, pp. 6096-6104, 2013, doi: 10.1016/j.egypro.2013.06.538.
Wang et al., "Spontaneous Cooling Absorption of CO2 by a Polymeric lonic Liquid for Direct Air Capture," J. Phys. Chem. Lett., vol. 8, No. 17, pp. 3986-3990, 2017, doi: 10.1021/acs.jpclett.7b01726.
Wang, et al., "Moisture swing sorbent for carbon dioxide capture from ambient air," Environ. Sci. Technol., vol. 45, No. 15, pp. 6670-6675, 2011, doi: 10.1021/es201180v.
Wang, et al., "Preparation and kinetics of a heterogeneous sorbent for CO2 capture from the atmosphere," Chem. Eng. J., vol. 284, pp. 679-686, 2016, doi: 10.1016/j.cej.2015.09.009.
Wang, et al., "Theoretical studies on CO2 capture behavior of quaternary ammonium-based polymeric ionic liquids," Phys. Chem. Chem. Phys., vol. 18, No. 18, pp. 13084-13091, 2016, doi: 10.1039/c5cp07229h.
Yang, et al. "Humidity-swing mechanism for CO2 capture from ambient air," Chem. Commun., vol. 54, No. 39, pp. 4915-4918, 2018, doi: 10.1039/c8cc02109k.
Yang et al., "Zwitterionic poly(arylene ether sulfone) copolymer/poly(arylene ether sulfone) blends for fouling-resistant desalination membranes", Journal of Membrane Science, (2018), 69-78, 561, http://doi.org/10.1016/j.memsci.2018.05.025.

* cited by examiner

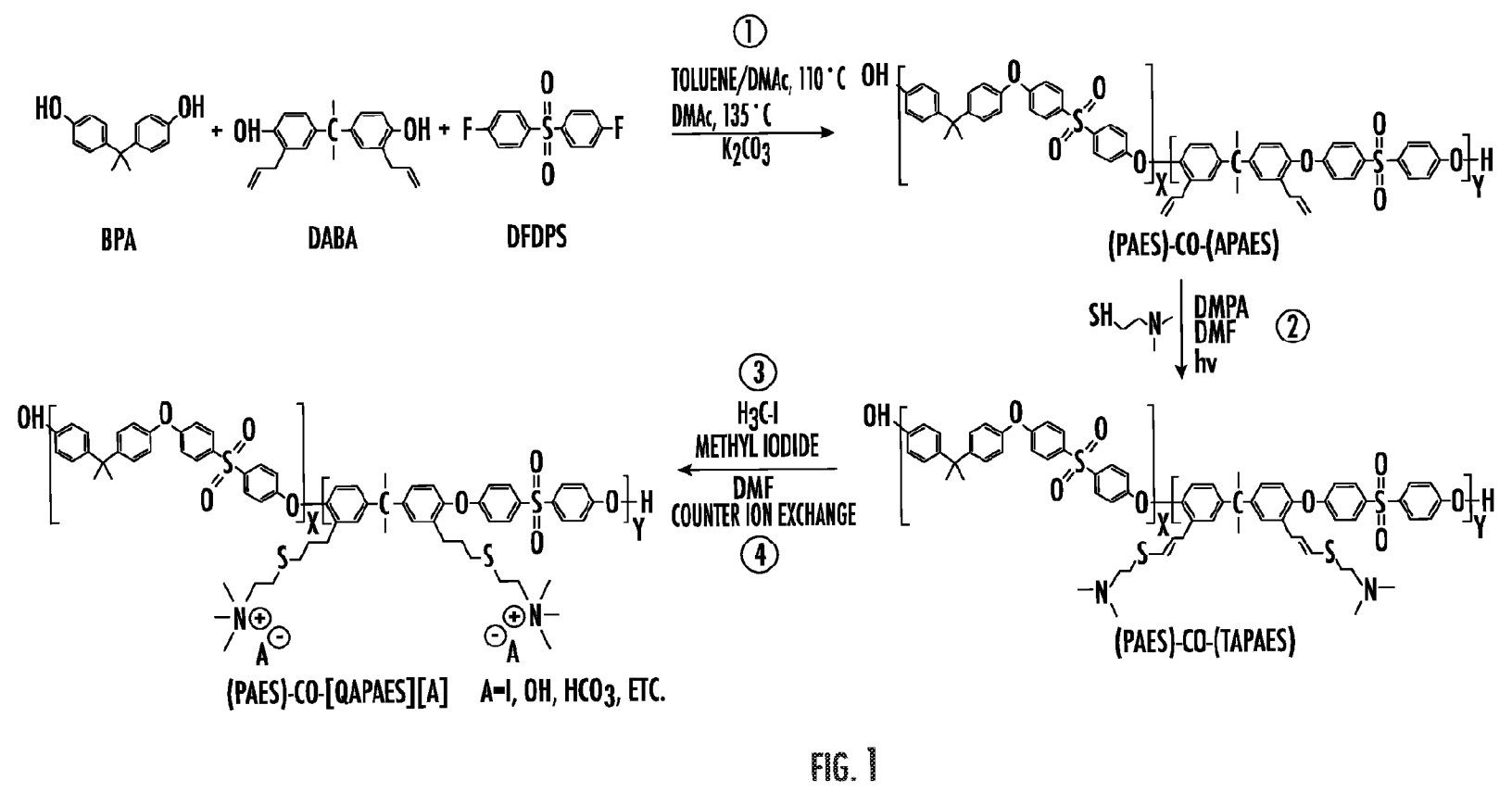

BPA

DABA

DFDPS

① TOLUENE/DMAc, 110°C
DMAc, 135°C
$K_2CO_3$ (PAES)-CO-(APAES)

② DMPA
DMF
hν

(PAES)-CO-(TAPAES)

③ $H_3C$-I
METHYL IODIDE
DMF
④ COUNTER ION EXCHANGE (PAES)-CO-[QAPAES][A]

A=I, OH, $HCO_3$, ETC.

FIG. 1

AMMONIUM-FUNCTIONALIZED POLYSULFONE COPOLYMERS FOR MOISTURE-SWING $CO_2$ CAPTURE

RELATED APPLICATIONS

This application is the U.S. National Stage of International Patent Application No. PCT/US2021/016060, filed Feb. 1, 2021, which claims the benefit of U.S. provisional patent application No. 62/968,140, filed Jan. 30, 2020 titled "Mining Air For Fuels and Fine Chemicals," the contents of each of which are hereby incorporated by reference in their entireties.

STATEMENT REGARDING FEDERALLY SPONSORED RESEARCH OR DEVELOPMENT

This invention was made with government support under DE-AR0001103 awarded by the Department of Energy. The government has certain rights in the invention.

TECHNICAL FIELD

Aspects of this document relate generally to ammonium-functionalized polysulfone copolymers.

BACKGROUND

Global $CO_2$ emissions to the atmosphere have been increasing steadily in the past years, reaching a recent value of 33 Gt in 2019. Even if strict environmental regulations are put into place, $CO_2$ must be removed from the atmosphere to stop rising temperatures from exceeding the 2° C. threshold set by the IPCC. Moreover, there is no end in sight for the demand for fossil fuels, which account for the lion's share of carbon-based emissions.

A necessary approach to mitigate the problem of increasing $CO_2$ levels is to remove it from the atmosphere by collecting and disposing or recycling it after being generated. Conventional $CO_2$ capture technologies commonly focus on addressing the emissions from large stationary (point) sources such as fossil fuel plants, cement plants, oil refineries, etc. via capture from the pre-combustion, during-combustion, and post-combustion stages. However, point source emissions only account for a minority of the $CO_2$ in the atmosphere, and conventional capture technologies are not suited for atmospheric capture.

SUMMARY

According to one aspect, a method of preparing a quaternary ammonium-functionalized poly(arylene ether sulfone) copolymer for moisture-swing CO2 capture includes reacting diallyl bisphenol A (DABA) with bisphenol A (BPA) and 4,4'-difluorodiphenyl sulfone (DFDPS) to form an allyl-modified poly(arylene ether sulfone) (PAES-co-APAES) copolymer. The method further includes modifying the PAES-co-APAES copolymer to convert the allyl functionalities to tertiary amines, forming tertiary amine-modified PAES (PAES-co-TAPAES) copolymer, and converting the tertiary amine of the PAES-co-TAPAES copolymer to quaternary ammonium, forming quaternary ammonium-modified PAES.

Particular embodiments may comprise one or more of the following features. The method may further include exchanging halide counterions of the quaternary ammonium-modified PAES with one of hydroxide, carbonate, chloride, bromide, fluoride, and bicarbonate ions. Converting the tertiary amine of the PAES-co-TAPAES copolymer to quaternary ammonium may include the addition of an alkyl halide to the PAES-CO-TAPAES copolymer. The alkyl halide may be methyl iodide. The method may further include processing the quaternary ammonium-modified PAES into one of a membrane, a film, and a hollow fiber. The processing of the quaternary ammonium-modified PAES may be performed before any counterion exchange. The quaternary ammonium-modified PAES may be processed into the hollow fiber. The hollow fiber may have a wall thickness between 50 μm and 500 μm. The ratio of BPA to DABA may be at most 1. The PAES-co-APAES copolymer may be modified through a thiolene-click reaction.

According to another aspect of the disclosure, a quaternary ammonium-functionalized poly(arylene ether sulfone) copolymer for moisture-swing CO2 capture includes a polysulfone copolymer having a copolymerization unit based on diallyl bisphenal A (DABA) and including quaternary ammonium functionalities.

Particular embodiments may comprise one or more of the following features. The copolymer may further include another copolymerization unit based on bisphenol A (BPA). The ratio of copolymerization units based on BPA to copolymerization units based on DABA may be at most 1. The copolymer may further include counter ions that are at least one of hydroxide, carbonate, chloride, bromide, fluoride, and bicarbonate. The copolymer may be processable into at least one of a membrane, a film, and a hollow fiber.

Aspects and applications of the disclosure presented here are described below in the drawings and detailed description. Unless specifically noted, it is intended that the words and phrases in the specification and the claims be given their plain, ordinary, and accustomed meaning to those of ordinary skill in the applicable arts. The inventors are fully aware that they can be their own lexicographers if desired. The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning. Absent such clear statements of intent to apply a "special" definition, it is the inventors' intent and desire that the simple, plain and ordinary meaning to the terms be applied to the interpretation of the specification and claims.

The inventors are also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventors are fully informed of the standards and application of the special provisions of 35 U.S.C. § 112 (f). Thus, the use of the words "function," "means" or "step" in the Detailed Description or Description of the Drawings or claims is not intended to somehow indicate a desire to invoke the special provisions of 35 U.S.C. § 112 (f), to define the invention. To the contrary, if the provisions of 35 U.S.C. § 112 (f) are sought to be invoked to define the inventions, the claims will specifically and expressly state the exact phrases "means for" or "step for", and will also recite the word "function" (i.e., will state "means for performing the function of [insert function]"), without also reciting in such phrases any structure, material or act in support of the function. Thus, even when the claims recite a "means for performing the function of . . . " or "step for performing the function of . . . ," if the claims also recite any structure, material or acts in support of that means or step, or that perform the recited function, then it is the clear intention of the inventors not to invoke the provisions of 35 U.S.C. § 112 (f). Moreover, even if the provisions of 35 U.S.C. § 112 (f) are invoked to define the claimed aspects, it is intended that these aspects not be limited only to the specific structure, material or acts that are described in the preferred embodiments, but in addition, include any and all structures, materials or acts that perform the claimed function as described in alternative embodiments or forms of the disclosure, or that are well known present or later-developed, equivalent structures, material or acts for performing the claimed function.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

The disclosure will hereinafter be described in conjunction with the appended drawings, where like designations denote like elements, and:

FIG. 1 is a reaction pathway for the production of a quaternary ammonium-functionalized poly(arylene ether sulfone) copolymer.

DETAILED DESCRIPTION

Figure 2:
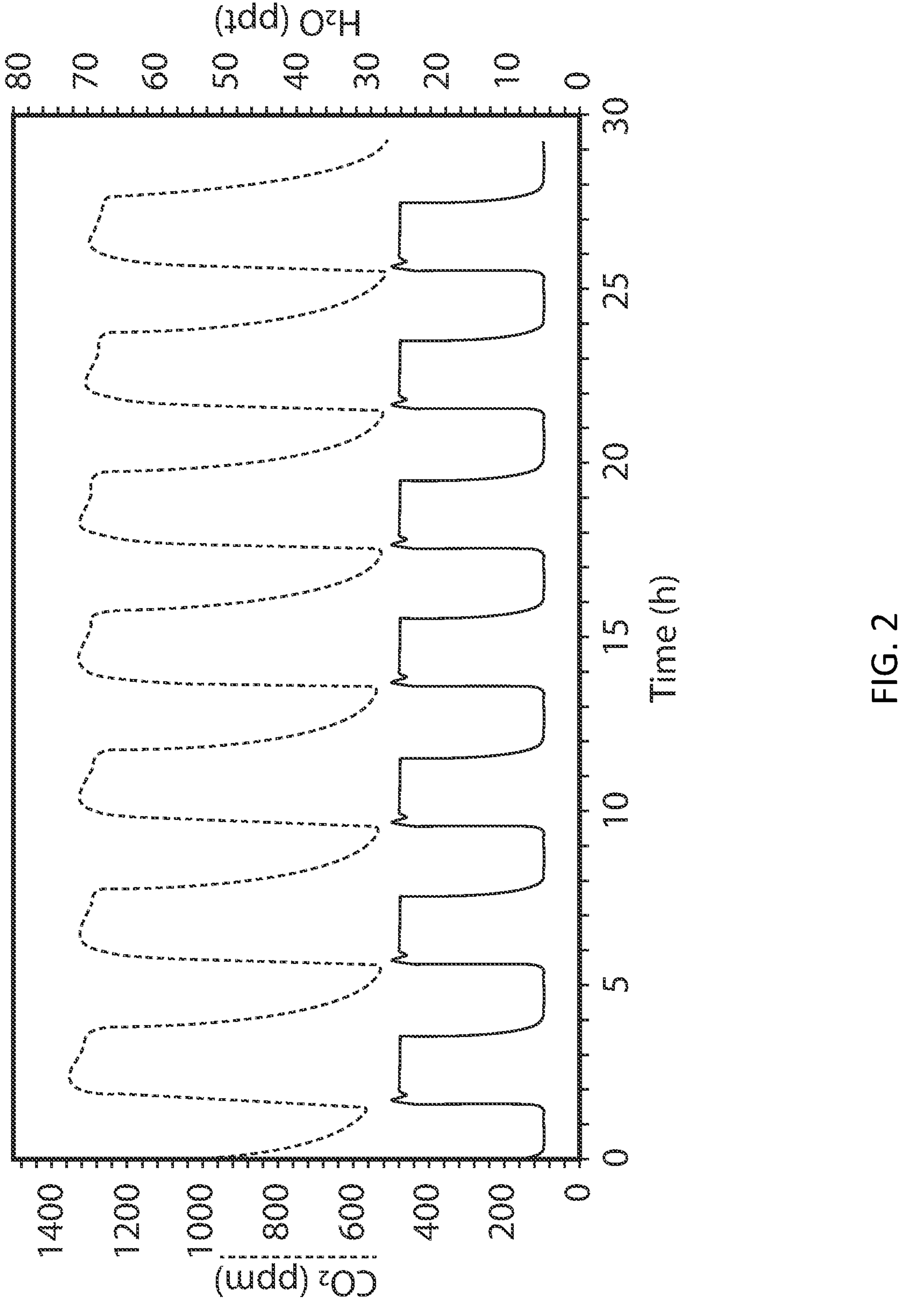
FIG. 2 is a chart of a sample data set showing the sorption and desorption of $CO_2$ by an embodiment of the quaternary ammonium-functionalized poly(arylene ether sulfone) copolymer, as a function of humidity.

This disclosure, its aspects and implementations, are not limited to the specific material types, components, methods, or other examples disclosed herein. Many additional material types, components, methods, and procedures known in the art are contemplated for use with particular implementations from this disclosure. Accordingly, for example, although particular implementations are disclosed, such implementations and implementing components may comprise any components, models, types, materials, versions, quantities, and/or the like as is known in the art for such systems and implementing components, consistent with the intended operation.

The word "exemplary," "example," or various forms thereof are used herein to mean serving as an example, instance, or illustration. Any aspect or design described herein as "exemplary" or as an "example" is not necessarily to be construed as preferred or advantageous over other aspects or designs. Furthermore, examples are provided solely for purposes of clarity and understanding and are not meant to limit or restrict the disclosed subject matter or relevant portions of this disclosure in any manner. It is to be appreciated that a myriad of additional or alternate examples of varying scope could have been presented, but have been omitted for purposes of brevity.

While this disclosure includes a number of embodiments in many different forms, there is shown in the drawings and will herein be described in detail particular embodiments with the understanding that the present disclosure is to be considered as an exemplification of the principles of the disclosed methods and systems, and is not intended to limit the broad aspect of the disclosed concepts to the embodiments illustrated.

Global $CO_2$ emissions to the atmosphere have been increasing steadily in the past years, reaching a recent value of 33 Gt in 2019. Even if strict environmental regulations are put into place, $CO_2$ must be removed from the atmosphere to stop rising temperatures from exceeding the 2° C. threshold set by the IPCC. Moreover, there is no end in sight for the demand for fossil fuels, which account for the lion's share of carbon-based emissions.

Fully controlling the level of $CO_2$ in the air without eliminating the use of fossil fuels will only be possible through removing it from the atmosphere by collecting and disposing or recycling it after being generated. A variety of mature technologies exist to scrub $CO_2$ from post-combustion streams, including liquid sorbents and membrane-based separations. However, these post-combustion streams are typically more than 5% $CO_2$, which means the economics and viable capture technologies are very different from those associated with removing $CO_2$ from ambient air that is roughly 0.04% $CO_2$.

Most of the current direct air capture (DAC) approaches are extracted from methods that are applicable in carbon capture from large point sources. These technologies mostly use chemisorption for the elimination of carbon from a gas stream. Some examples are oxides, hydroxides or alkaline salts which have high chemical binding energy with $CO_2$, and as a result, high capacities and selectivities for carbon capture. However, the regeneration of these sorbents requires high temperatures to overcome these high binding energies, and they are corrosive liquid solutions. The high energy demand of these sorbents makes them uneconomical to use for DAC.

On the other hand are sorbents that capture $CO_2$ by physisorption. Materials which capture $CO_2$ via physisorption have lower regeneration energy requirements due to weaker bonds. However, the drive for carbon capture is also lower in these materials. This makes their use impractical for DAC, which deals with low partial pressures of $CO_2$.

A potential solution to this problem lies in the moisture-swing phenomenon. In the moisture swing cycle, in relatively dry environments, $CO_2$ reacts with basic counterions (typically hydroxide ($OH^-$) or carbonate ($CO_3^{2-}$)) and produces bicarbonates as $CO_2$ is removed from the air. In a humid or wet environment, the $CO_2$ is released as the OH or $CO_3^{2-}$ counterions are regenerated. This is an attractive method, as it has low energy requirements. The sorption and desorption of $CO_2$ is triggered by only moisture. The energy related to water evaporation drives the moisture swing cycle.

The moisture swing method is advantageous compared to the two previous methods because it has high selectivity and capacity for carbon capture and low regeneration costs. Here, $CO_2$ is adsorbed via a chemisorption process. The sorbents affinity to $CO_2$ changes through the interaction with moisture, and the $CO_2$ is released without the need of high thermal energy input.

Current state of the art moisture-swing technologies rely on materials which are unfortunately challenging to commercialize. They tend to be very brittle, and cannot be processed into fibers or membranes, limiting the use of these ion exchange resins to batch processes in the form of resin beads. Beds of these ion exchange resin beads are repeatedly exposed to dry and wet environments, capturing $CO_2$ from the dry environment and releasing it into the wet environment.

Contemplated herein is a polysulfone-based sorbent for moisture-swing $CO_2$ capture, and the methods to produce said sorbent. More specifically, an ammonium-functionalized poly(arylene ether sulfone) copolymer is disclosed, which can act as a sorbent for the direct air capture (DAC) of carbon dioxide. The ammonium functionality enables sorption and release of $CO_2$ via the moisture swing phenomenon, with all of its low energy advantages.

From a materials perspective, the polysulfone contemplated herein has additional advantages over conventional ion exchange resins. The polymer is processable into a wide range of materials including, but not limited to, porous films, dense films, nonwoven fibrous membranes, and hollow fiber membranes. According to various embodiments, the pore sizes in the porous materials is tunable, and can range from about 2 μm to about 50 μm. Film thicknesses can range from 50 nm to 5 mm, or more. The fibrous membranes can be prepared by electrospinning with fiber diameters ranging from 100 nm-10 μm or by melt blowing with fiber diameters ranging from 500 nm to 100 μm.

In some embodiments, hollow fibers composed of the contemplated polysulfone can be on the order of 0.5-5 mm in diameter, with wall thicknesses of 50-500 μm. The ability to form hollow fibers with the contemplated moisture-swing polymers presents opportunities for new use cases not possible with conventional materials.

The ammonium-functionalized poly(arylene ether sulfone) copolymer contemplated herein is a moisture-swing material, which releases $CO_2$ captured from a relatively dry environment when exposed to a humid or wet environment. Such an environment may comprise water vapor, liquid water, or both. In some embodiments, steam may be utilized as a release material, providing both moisture and heat, which may accelerate the process. In some embodiments, the wet environment may be entirely filled with liquid.

The contemplated polysulfones are able to capture and release $CO_2$ without the need of high thermal energy input, making their use in removing $CO_2$ from the atmosphere, where it is very dilute, economically viable. The non-limiting examples of applications for the contemplated materials discussed below will all focus on direct air capture technology adapted for atmospheric carbon dioxide. However, it should be noted, that the materials and devices contemplated herein may be adapted for use in other contexts, including but not limited to capturing $CO_2$ from industrial processes and capturing $CO_2$ from a forced, enriched, or pressurized gas source.

FIG. 1 is a non-limiting example of a reaction pathway for the production of a quaternary ammonium-functionalized poly(arylene ether sulfone) copolymer. According to various embodiments, the production of ammonium-functionalized poly(arylene ether sulfone) sorbent with basic counterions is a five step process. The first step is the polymerization to form the allyl-modified poly(arylene ether sulfone) (PAES-co-APAES) copolymer, the second step is a post-polymerization modification reaction to create a tertiary amine-modified PAES (PAES-co-TAPAES) copolymer, the third step is quaternization of the amine to form the quaternary ammonium-modified PAES ((PAES)-co-[QPAES][I]) copolymer, the fourth step is a counterion exchange ((PAES)-co-[QPAES][OH]), and the last step is the membrane fabrication. Steps one through four are shown in FIG. 1 as 'circle 1' through 'circle 4', respectively.

The first step is the synthesis of an allyl-modified poly (arylene ether sulfone) (hereinafter PAES-co-APAES) copolymer. PAES-co-APAES is synthesized via a polycondensation reaction. Unique to the contemplated polymers, this polysulfone incorporates diallyl bisphenol A (DABA) as a monomer within the polysulfone backbone, which plays an important role in the subsequent functionalization, as will be discussed. The use of DABA as a monomer in the contemplated polysulfone copolymer provides it with many of its advantages over conventional ion exchange polymers. According to various embodiments, PAES-co-APAES may be synthesized by combining DABA with bisphenol A (BPA) and 4,4'-difluorodiphenyl sulfone (DFDPS).

What follows is a specific, non-limiting example of the procedures to produce the PAES-co-APAES copolymer. Those skilled in the art will recognize that the stepwise production of the novel polymers contemplated herein may be accomplished using a number of steps, some of which are well known and interchangeable with other well-known techniques and methods. According to various embodiments, the DABA, BPA, and DFDPS, along with potassium carbonate ($K_2CO_3$), are added to a three-neck 250 mL flask along with a mechanical stirrer. The flask is equipped with a dean-stark trap, a reflux condenser and a nitrogen inlet/outlet, as is known in the art. In one embodiment, the PAES-co-APAES copolymer is synthesized with an off-set stoichiometry of 1/0.94 aryl halide/phenol. Dimethylacetamide (DMAc) is added to dissolve the monomers, and toluene is added to remove water. The solution is then purged with nitrogen, and heated to 80° C. to remove the water-toluene azeotrope. The resulting mixture is then heated to 110° C. to remove the residual toluene.

According to various embodiments, the heating continues under a static nitrogen atmosphere at 135° C. Conventional, commercial syntheses of polysulfones typically use higher temperatures (e.g. 180-220° C.). The incorporation of the DABA monomer in the polysulfone backbone is facilitated by the lower temperature, according to various embodiments. The reaction is allowed to continue running until a copolymer with a desired molecular weight has been achieved. The specific period of time required to achieve a specific molecular weight is dependent on the scale of the reaction, as known in the art. The reaction mixture is subsequently diluted with THE, cooled to room temperature, filtered to remove salts, and then precipitated through addition to stirring DI water. The polymer may then be dried, under vacuum, at 100° C. These steps may be repeated multiple times after redissolving the dried polymer in THF, until a target purity has been met.

According to various embodiments, different BPA/DABA ratios may be used in step one to manipulate the charge content on the polysulfone polymer backbone. Between the endpoints of purely BPA and purely DABA lie a wide range of molar ratios and resultant functionalities, given by DABA/(DABA+BPA). In one embodiment, PAES-co-APAES may have 25% functionality, with a BPA/DABA molar ratio of 3 to 1. In another embodiment, 50% functionality is achieved through a molar ratio of 1 to 1. In still another embodiment, a functionality of 75% results from a BPA/DABA molar ratio of 1 to 3. Those skilled in the art will recognize other molar ratios that would result in other functionalities.

The second step ('circle 2') is a post-polymerization modification of the PAES-co-APAES to create a tertiary amine-modified PAES (hereinafter PAES-co-TAPAES) copolymer. According to various embodiments, the incorporation of the tertiary amine functional groups is accomplished via the thiolene-click reaction, which modifies the allyl functionalities and converts them to tertiary amines. Specifically, the tertiary-amine-containing thiol groups react with the double bonds on the allyl sites on DABA. The reaction consists of dissolving the PAES-co-APAES copolymer of the first step, 2-(dimethylamino) ethanethiol, and 2,2-dimethoxy-2-phenylacetophenone (DMPA) photo-initiator in N,N-Dimethylformamide (DMF). The resulting mixture is poured into a round-bottom flask, purged with nitrogen and irradiated using a compact UV lamp emitting at 365 nm. All of this may be done at room temperature. The resulting product, PAES-co-TAPAES, is isolated by precipitation in DI water, and dried under vacuum at 100° C.

The third step ('circle 3') is the conversion of the tertiary amine groups to quaternary ammonium, forming a quaternary ammonium-modified PAES (hereinafter (PAES)-co [QPAES][I]) copolymer. According to various embodiments, an alkyl halide is added in excess to a solution of PAES-co-TAPAES, which undergoes the Menshutkin reaction, converting the tertiary amine to quaternary ammonium. In a specific embodiment, methyl iodide is added in excess to a solution of PAES-co-TAPAES in DMF. In other embodiments, the alkyl halide may be bromomethane, bromoethane, bromobutane, alkanes paired with iodide, chloride, or bromide, and the like. The mixture is stirred at room temperature and dialyzed against DMF in a dialysis bag (1 kDa MWCO) for 3 days, while the DMF outside the dialysis bag is exchanged with fresh DMF every couple of hours. The resulting (PAES)-co-[QPAES][I] is isolated through precipitation in stirring DI water and dried under vacuum at 100° C.

The fourth step ('circle 4') is the exchanging of the counter ion of the halide from step three with a counterion better adapted for $CO_2$ capture reactions. This exchange may be accomplished using a dialysis bag, or solution, as known in the art. For example, a dialysis bag with a molecular weight cutoff (MWCO) of 1 kDa may be used. The MWCO determines, approximately, what size molecule can pass through the dialysis membrane. As a specific example, in one embodiment, where the alkyl halide of step three is methyl iodide, the counter ion of iodide in (PAES)-co-[QPAES][I] is exchanged with hydroxides, which are active in $CO_2$ capture reactions. This is done by dialyzing (PAES)-co-[QPAES][I] against a KOH solution. A molar ratio of 10:1 for hydroxides:ammoniums is used, with the hydroxides coming from KOH and the ammoniums coming from functional groups on the polymer. The process time varies (e.g. 2-3 days, etc.) depending on the initial functionality percentage of the copolymer from step three. Other exemplary anions that could be exchanged with the counter ion of the third step include carbonate, iodide, chloride, bromide, fluoride, and bicarbonate.

The fifth step is the formation of a membrane or other structure for implementation. It should be noted that the fourth and fifth steps may be done in any order. In some embodiments, a membrane/film/structure may be fabricated from the (PAES)-co-QPAES copolymer after the exchanging of the counter ion. In other embodiments, the counter ion exchange may be performed on the membrane/film/structure after it is formed from the copolymer of step three. As a specific example, in one embodiment, a PAES-co-[QA-PAES] membrane/film is inserted inside a stirring solution containing KOH salt and in DI water in a molar ratio ten times greater relative to the theoretical number of functional groups on the polymer.

Before discussing the fabrication of membranes and other structures from the contemplated polysulfone copolymer, it should be noted that other reaction pathways exist to add quaternary ammonium functionalities to a regular polysulfone backbone. For example, the quaternary ammonium functionalities may be added to an existing monomer (e.g. BPA) of a regular polysulfone chain. This may be accomplished by using chlorotrimethyl silane or chloromethyl ethyl ether to first produce chloromethylated polysulfone (i.e., a benzyl chloride). These benzyl chloride sites on the polysulfone are then reacted with dimethyl amine or trimethyl amine to form quaternary ammoniums.

However, the contemplated polymers that incorporate the DABA monomer are fundamentally different from these other quaternary ammonium functionalized polysulfones. A key distinguishing feature is the physical distance between the ammonium and the polymer backbone. The $CO_2$ capture process relies on the interaction of charged ions in solution with the charged ions on the polymer. In the case of bivalent ions ($CO_3^{2-}$) the charged ion requires two cationic charges to achieve electroneutrality. Therefore, having the charged groups pendant from the polymer backbone can help stabilize and favor certain ionic species. When the charge group is tight against the polymer backbone, the polymer microstructure and architecture will dictate the physical proximity.

In the fifth step, the quaternary ammonium-modified PAES (e.g. (PAES)-co-[QPAES][I] of step three, (PAES)-co-[QPAES][OH] of step four, etc.) is processed into porous films, dense films, nonwoven fibrous membranes, hollow fibers, and the like. The pore sizes in the porous materials can range from about 2 μm to about 50 μm. Film thicknesses can range from 50 nm to 5 mm, or more. The fibrous membranes can be prepared by electrospinning with fiber diameters ranging from 100 nm-10 μm or by melt blowing with fiber diameters ranging from 500 nm to 100 μm. The hollow fibers can be on the order of 0.5-5 mm in diameter, with wall thicknesses of 50-500 μm. This is a significant deviation from the prior art that utilizes ion exchange resin beads, which are not processable.

The following is a specific, non-limiting example of a protocol for making dense membranes of PAES-co-QPAES copolymers having a thickness of more than 100 microns. A 2.5 wt. % solution of PAES-co-QPAES copolymer in DMF is prepared and put on a sonicator with a magnetic stirrer. The homogeneous solution is then poured inside a flat-bottomed petri dish and left to sit at room temperature overnight. A non-hermetically sealed glass lid is put on top of the petri dish to degas the solution by equilibrating with the air above. The petri dish is placed under vacuum at temperatures of 22° C., 40° C. and 80° C., each temperature held for 24 hours, to evaporate the solvent. The dried membrane is removed from the petri dish by pouring DI water into the petri dish and then peeling off the membrane once it has swelled.

Advantageous over other moisture-swing materials, the contemplated PAES copolymers may be processed into a variety of forms, such as flat sheets or films, or hollow fiber membranes/films. Conventional materials are limited to being used as resin beads in beds.

FIG. 2 is a chart of a sample data set showing the sorption and desorption of $CO_2$ by an embodiment of the quaternary ammonium-functionalized poly(arylene ether sulfone) copolymer, as a function of humidity. This chart demonstrates the utility of the PAES-co-[QPAES][OH] copolymer for moisture-modulated $CO_2$ capture. The solid line shows the humidity level in parts per thousand (ppt) inside a chamber which is cycled between 25 ppt and 5 ppt. The chamber also contains the polysulfone copolymer sorbent. When the moisture level is high (25 ppt), the $CO_2$ concentration (dashed line) in the chamber rises as the sorbent releases $CO_2$ through the moisture swing process described above. When the humidity is decreased to 5 ppt the $CO_2$ concentration in the chamber decreases by ~800 parts per million (ppm).

The bottom line in the figure shows the water concentration (parts per thousand) in the ambient air, as the water concentration increases the sample releases $CO_2$ causing the $CO_2$ concentration to rise. When the water concentration decreases the sample sorbs $CO_2$ causing the $CO_2$ concentration to decrease. The water concentration is cycled to show that the moisture-swing phenomenon can be repeated over many cycles (7+).

In the moisture swing cycle, at low humidity levels, carbonate ions present on a moisture-swing sorbent react with the few remaining waters to form bicarbonate and hydroxide ions. This reaction is favored at low moisture content because the lack of water preferentially destabilizes the hydration cloud of the doubly charged carbonate ion. The presence of hydroxide attracts $CO_2$ and makes the dry sorbent a strong sorbent for $CO_2$. Exposure to moisture re-stabilizes carbonate relative to bicarbonate. In the loaded bi-carbonate state this transition destabilizes the bicarbonate and results in a much higher equilibrium partial pressure of $CO_2$. In a batch process, by harvesting the $CO_2$ gas, one can induce the sorbent to fall back to the carbonate state. Subsequent drying will once again produce a bicarbonate/hydroxide mixture that will repeat the collection cycle.

The membranes/films produced from the contemplated polysulfone copolymers retain the chemical and transport properties discussed, yet they also have the appropriate mechanical properties to be made in form of stable hollow fiber membranes or other structures. The hollow fiber membranes can be used as a moisture sensitive sorbent, or they can be deployed in an entirely different process that takes advantage of the moisture effect in activating $CO_2$ transport through the membrane.

Where the above examples, embodiments and implementations reference examples, it should be understood by those of ordinary skill in the art that other embodiments could be intermixed or substituted with those provided. In places where the description above refers to particular embodiments of an ammonium-functionalized poly(arylene ether sulfone copolymer for moisture-swing capture of $CO_2$ and production methods of the same, it should be readily apparent that a number of modifications may be made without departing from the spirit thereof and that these embodiments and implementations may be applied to other moisture-swing technologies as well. Accordingly, the disclosed subject matter is intended to embrace all such alterations, modifications and variations that fall within the spirit and scope of the disclosure and the knowledge of one of ordinary skill in the art.

What is claimed is:

1. A quaternary ammonium-functionalized poly(arylene ether sulfone) copolymer for moisture-swing CO2 capture, comprising a polysulfone copolymer having a copolymerization unit based on diallyl bisphenol A (DABA) and comprising quaternary ammonium functionalities, wherein the quaternary ammonium functionalities are pendant from a backbone of the polysulfone copolymer at allyl sites of the copolymerization unit based on DABA, and wherein the allyl functionalities are converted to tertiary amines via a thiol-ene click reaction using a tertiary-amine-containing thiol group and a photoinitiator.

2. The copolymer of claim 1, further comprising another copolymerization unit based on bisphenol A (BPA).

3. The copolymer of claim 2, wherein the ratio of copolymerization units based on BPA to copolymerization units based on DABA is at most 1.

4. The copolymer of claim 1, further comprising counter ions that are at least one of hydroxide, carbonate, chloride, bromide, fluoride, and bicarbonate.

5. The copolymer of claim 1, wherein the copolymer is processable into at least one of a membrane, a film, and a hollow fiber.

6. The copolymer of claim 1, wherein the quaternary ammonium groups are associated with hydroxide counterions obtained by dialyzing against a KOH solution.

7. The copolymer of claim 1, wherein the quaternary ammonium functionalities are pendant at allyl sites through a sulfur-containing linkage.

8. A quaternary ammonium-functionalized poly(arylene ether sulfone) copolymer for moisture-swing CO2 capture, comprising a polysulfone copolymer having a copolymerization unit based on diallyl bisphenol A (DABA) and comprising quaternary ammonium functionalities, wherein the quaternary ammonium functionalities are pendant from a backbone of the polysulfone copolymer at allyl sites of the copolymerization unit based on DABA, and wherein the quaternary ammonium functionalities are pendant at allyl sites through a sulfur-containing linkage.

9. The copolymer of claim 8, further comprising another copolymerization unit based on bisphenol A (BPA).

10. The copolymer of claim 9, wherein the ratio of copolymerization units based on BPA to copolymerization units based on DABA is at most 1.

11. The copolymer of claim 8, further comprising counter ions that are at least one of hydroxide, carbonate, chloride, bromide, fluoride, and bicarbonate.

12. The copolymer of claim 8, wherein the copolymer is processable into at least one of a membrane, a film, and a hollow fiber.

13. The copolymer of claim 8, wherein the allyl functionalities are converted to tertiary amines via a thiol-ene click reaction using a tertiary-amine-containing thiol group and a photoinitiator.

14. The copolymer of claim 8, wherein the quaternary ammonium groups are associated with hydroxide counterions obtained by dialyzing against a KOH solution.

* * * * *